INVENTOR.
MORRIS RINGER
BY Fred Jacob
ATTORNEY

May 26, 1964 M. RINGER 3,134,967

ELECTRICAL APPARATUS

Filed Nov. 4, 1960 5 Sheets-Sheet 2

INVENTOR.
MORRIS RINGER

BY *Fred Jacob*

ATTORNEY

May 26, 1964 M. RINGER 3,134,967

ELECTRICAL APPARATUS

Filed Nov. 4, 1960 5 Sheets-Sheet 3

INVENTOR.
MORRIS RINGER
BY
Fred Jacob
ATTORNEY

May 26, 1964 M. RINGER 3,134,967

ELECTRICAL APPARATUS

Filed Nov. 4, 1960 5 Sheets-Sheet 4

INVENTOR.
MORRIS RINGER

BY Fred Jacob

ATTORNEY

May 26, 1964 M. RINGER 3,134,967

ELECTRICAL APPARATUS

Filed Nov. 4, 1960

5 Sheets-Sheet 5

INVENTOR.
MORRIS RINGER
BY
Fred Jacob
ATTORNEY

United States Patent Office 3,134,967
Patented May 26, 1964

3,134,967
ELECTRICAL APPARATUS

Morris Ringer, Belmont, Mass., assignor to Minneapolis-Honeywell Regulator Company, Minneapolis, Minn., a corporation of Delaware Filed Nov. 4, 1960, Ser. No. 67,384
21 Claims. (Cl. 340—174)

This invention relates in general to a new and improved data storage device, and in particular to a data storage device consisting of a plurality of bistable elements and means for selecting chosen ones of these elements.

Data storage systems of the type herein discussed frequently take the form of a magnetic core matrix, each core having a substantially rectangular hysteresis characteristic and requiring a predetermined threshold level of energization to switch from one stable magnetic state to the other. Conventionally, the cores are organized into columns and rows, each core being threaded by one column conductor and one row conductor. A core selection is made by the well-known coincident current technique, whereby two or more conductors linking the selected core are simultaneously pulsed by inducing a flux in the core. The currents in the conductors then energize the latter jointly in the same direction to a level beyond its threshold and cause it to switch states. Suitable read-out means are provided to detect the change of state.

Since the aforementioned currents are only jointly capable of energizing a core to its threshold level, the remaining cores in the particular column and row respectively which are energized will not switch states. If a three-dimensional matrix is employed wherein a number of core planes are stacked on top of each other, each consisting of a plurality of core rows and core columns, it is customary to energize an entire column stack and row stack simultaneously. A core must be selected not only on the basis of its position in a column and row stack but also on the basis of the core plane in which it is disposed. To this end, the cores of each plane may further be threaded by a vertical selection winding which is capable of energizing the cores in the same direction as the column stack and row stack. The amplitudes of the individual currents are so chosen that the core threshold level is exceeded only when the core is simultaneously energized by all three currents.

Although the above-described coincident current technique has found wide acceptance, it is nevertheless subject to a number of disadvantages. Primary among these is the fact that two or more current sources are required to provide the drive pulses necessary to energize a selected core row and core column and core plane simultaneously. The amplitude of the drive pulses is critical since a pulse with too great an amplitude, e.g. a pulse applied to a core row, is capable of switching the stable state of every core in the row without the presence of column and vertical selection pulses. On the other hand, if the amplitude of the drive pulses is too small, no switching may occur even if all the pulses energize a selected core simultaneously.

In a coincident current core matrix, particularly one that operates at high frequencies, the pulse width as well as the pulse amplitude is critical. If the pulse duration of one of the drive sources is maintained beyond its critical limit, it may overlap a subsequently applied pulse of another drive source to switch the magnetic state of a core that has not been selected. On the other hand, if the pulse does not have sufficient width, it may not transmit sufficient power to energize the cores by the required amount. In the latter case, even the coincident curent energization of a core may fail to switch it. It will be obvious, therefore, that the synchronization of the pulse sources as well as the pulse width is critical.

In a coincident current core matrix it is further necessary to control the characteristics of the individual cores within very narrow limits. The reason for this resides in the requirement that the same amount of energy be used to switch the magnetic state of any given core. Any variation in the core characteristics beyond these critical limits may result in the failure of certain cores to switch upon the application of a pair of coincident pulses or, alternatively, in the failure of a given core to remain in the same stable state upon the application of a single drive pulse.

Prior art coincident current core matrices frequently fall short of satisfactory performance due to the causes of failure outlined above. Accordingly, it is a primary object of this invention to provide a data storage device which is not subject to the foregoing disadvantages.

It is a further object of this invention to provide a data storage device which comprises a plurality of bistable elements that may be individually selected by the use of a single drive pulse source.

It is another object of this invention to provide a magnetic core matrix in which core selection is far less dependent upon the characteristics of the individual cores than was heretofore possible.

In its simplest form, the invention which forms the subject matter of this application consists of a plurality of bistable elements which are organized into two sub-groups, e.g. columns and rows. The columns are selectively adapted to be energized from a single pulse source to a point below the threshold level of the cores. Means are provided for establishing a closed conductive path which links a selected core row in one sense and the remaining core rows in the opposite sense. Upon the energization of the selected core column, the transformer action in the cores, which are jointly linked by the column energizing means and the closed path, causes a current to flow in the latter. The sense in which the conductive path links the respective core rows is so chosen that the energization due to the resultant current in the path is in the same direction in the selected core row as the energization due to the pulsing of the selected core column. The resultant current in the conductive path is by itself incapable of driving the cores beyond their threshold. However, the energization of the selected core by the resultant current, together with the energization of the core as a member of the selected column, is sufficient to switch the core to its other stable state. Accordingly, within relaitvely wide limits core switching is not critically dependent on the width of the applied pulses, nor on the synchronization of the applied pulses. It occurs in synchronism with the pulses applied from a single source whose amplitude may vary within relatively wide limits.

The various novel features which characterize the invention are pointed out with particularity in the claims annexed to and forming a part of this specification. For a better understanding of the invention, its advantages and specific objects thereof, reference should be had to the following detailed description and the accompanying drawings in which:

With reference now to the drawings, FIGURE 1 shows a core matrix consisting of a single plane of bistable cores which are organized into columns 1, 2, 3 . . . *n* and rows A, B, C . . . *m*. Each of the cores preferably has a substantially rectangular hysteresis characteristic and requires a predetermined threshold level of energization to switch from one of its stable states to the other. Each core column is linked in the same sense by a single conductor which is connected between the output of a column selection circuit 10 and ground. Column selection occurs in response to a signal applied to an input 12 of the column selection circuit to cause the next pulse originating in the drive pulse source 14 to be placed on the selected column conductor.

Figures 1A, 1B:
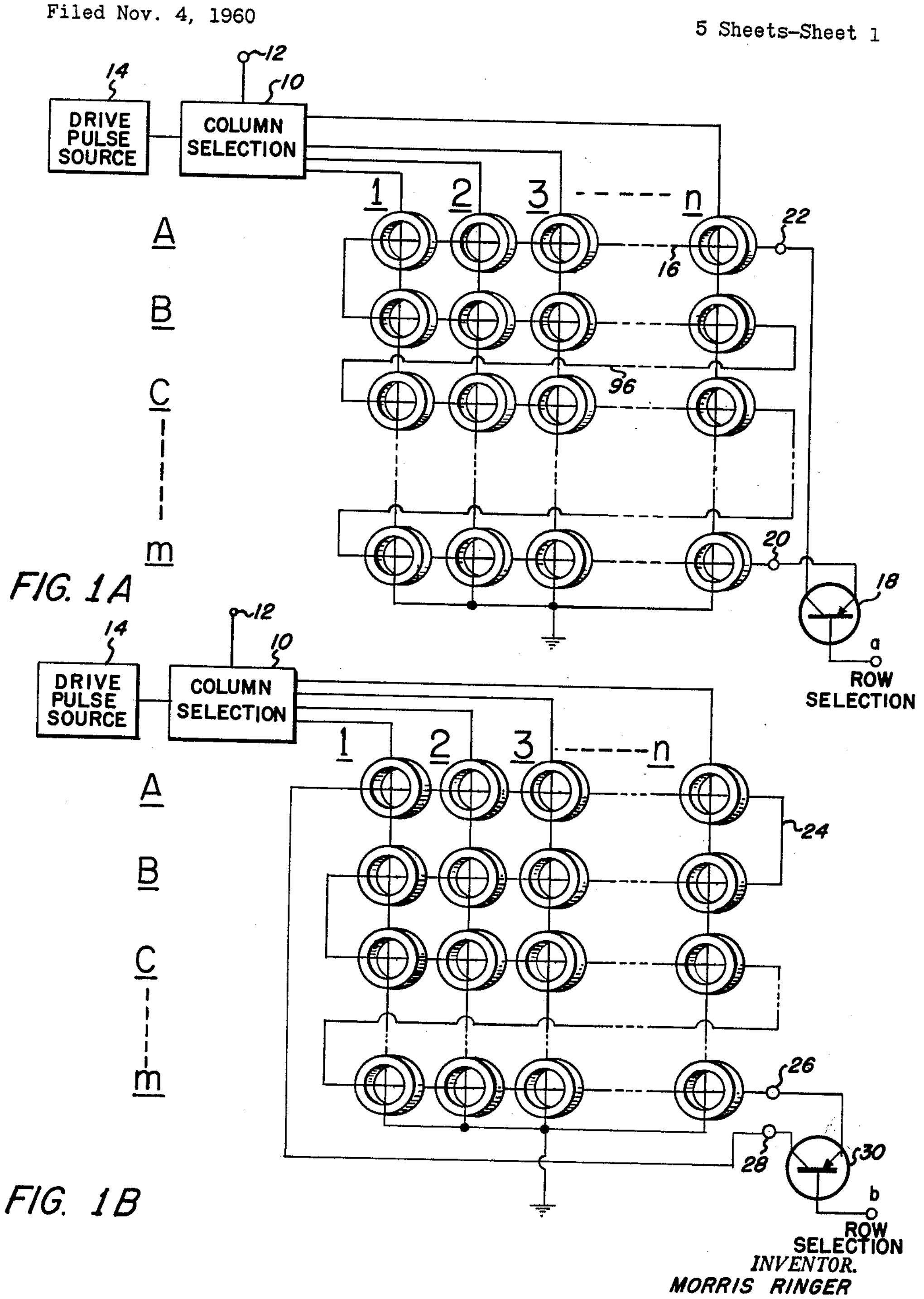
FIGURE 1 illustrates one embodiment of the invention.
Figures 1C, 2:
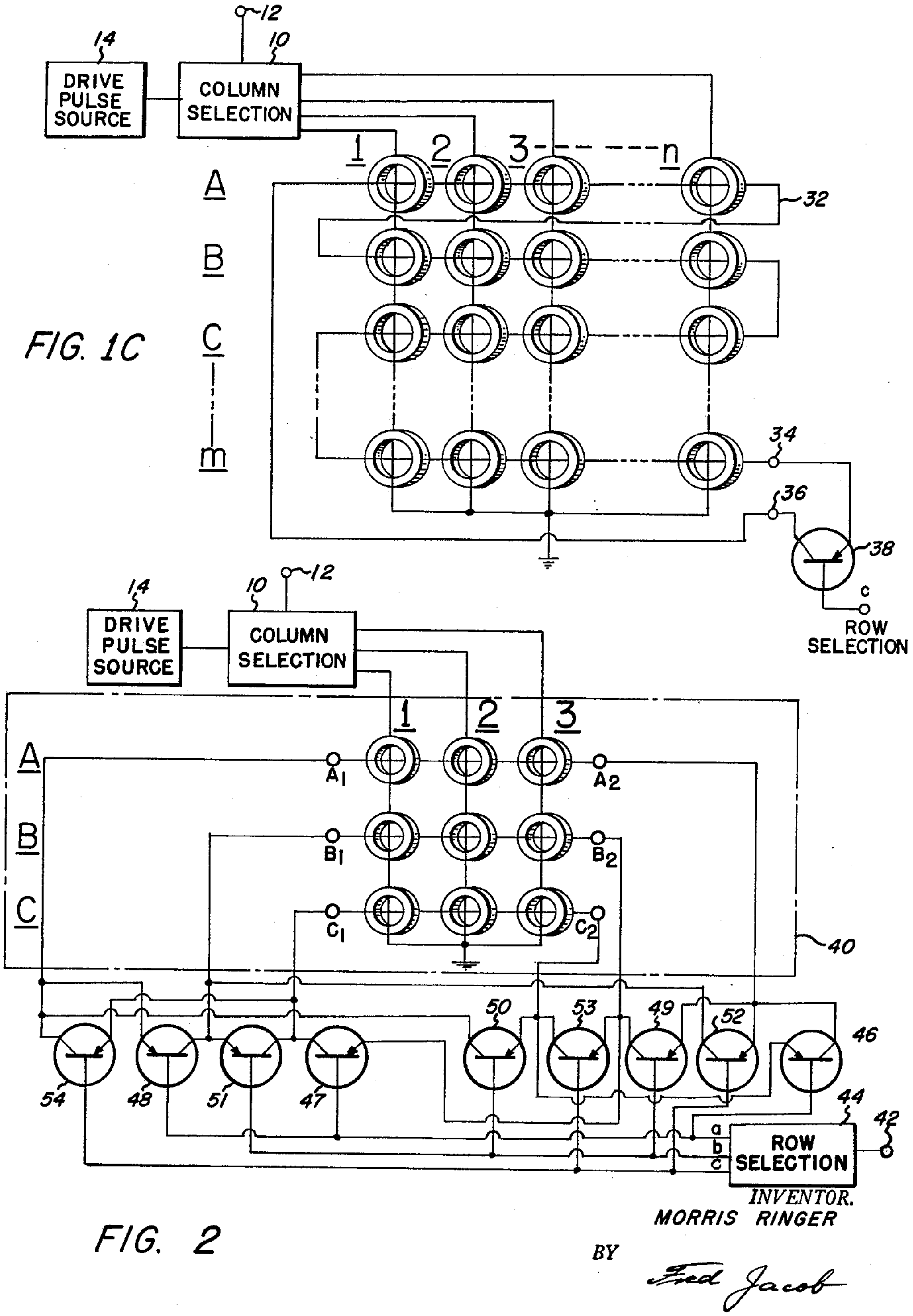
FIGURE 2 illustrates another embodiment of the invention.

For the sake of clarity, each of FIGURES 1A, 1B and 1C is limited respectively to a single matrix connection, it being understood that the separately illustrated conductive paths are simultaneously present in the core matrix. In FIGURE 1A, a single conductor 16 which threads every core row is seen to link the row A in a first sense and the rows B, C . . . *m* in the opposite sense. Thus, current flowing in the conductor 16 will energize each of the cores of row A in a first direction, i.e. it will induce a flux in each of these cores in a first direction, while the cores of rows B, C . . . *m* are energized in the opposite direction. The conductor 16 terminates in a pair of terminals 20 and 22. A transistor 18 has its emitter connected to the terminal 20 while its collector is connected to the terminal 22. The base of the transistor 18 is connected to a terminal *a* of a row selection circuit.

The operation of the circuit will become clear from the following description of the "selection" of a core, in this case, the core which is defined by the intersection of the column 2 and of the row A, and which is hereafter referred to as the core 2–A. Core selection occurs by switching the core 2–A to its other stable state. To this end, the terminal *a* of the row selection circuit is energized to render the transistor 18 conductive, thereby effectively short-circuiting the terminals 20 and 22. Thereafter, the input 12 of the column selection circuit 10 is suitably energized to cause the latter to place the subsequently occurring drive pulse from the source 14 on the conductor which links the column 2. The drive pulse amplitude is chosen so as to energize all the cores of the pulsed column in a first direction to a point below their respective threshold levels.

The flux in each of the cores of the column 2 which is due to the drive pulse induces a voltage in the linking conductor 16 by means of transformer action. Since the characteristics of the respective cores are essentially alike and their turns ratios are identical, the amplitude of the respective induced voltages is the same. However, the polarity of the voltage due to the core 2–A is opposite to that due to the cores 2–B, 2–C . . . 2–*m* respectively, the resultant voltage determining the current which flows in the short-circuited conductor 16 upon the energization of the column 2.

The turns ratio of each core is so chosen that the current which flows in the short-circuited conductor 16 is comparable to that due to the drive pulse, but is insufficient to energize the core to its threshold level. For example, using single-turn windings and employing a current source as a drive pulse source, an effective short circuit of the secondary winding results in currents of equal amplitude in the primary and secondary windings. If the current applied to the conductor which links the column 2 is a "half-select" current, i.e. if its amplitude is one-half that required to switch a core, the current flowing in the short circuit path 16 which links the cores of the row A in a first sense will similarly be a "half-select" current. Accordingly, these cores will be energized by the resultant current in the aforesaid first direction to a point below their respective threshold levels. Conversely, the cores of the rows B, C . . . *m* respectively, which are linked in the opposite sense, are energized in the opposite direction by the resultant current to a point below their respective threshold levels.

The energization of the cores 2–B, 2–C . . . 2–*m* respectively by the drive pulse is in the opposite direction to the energization of these cores by the resultant short-circuit current. Accordingly, these cores remain in their present stable state. The total energization of the core 2–A, however, which is jointly energized in the aforesaid first direction by the drive pulse and by the resultant current, exceeds the core threshold level in the first direction and causes the core to switch stable states.

It will be apparent to those skilled in the art that provision must be made for reading out the information in the cores, e.g. by the addition of a read-out winding for each core. Similarly, means must be provided for selectively returning the cores to their original stable states once they have been switched. The means for carrying out these operations are well known in the art and have been omitted herein for the sake of clarity.

FIGURE 1B is limited to illustrating the connection of the core matrix for selecting a core in the row B. It will be noted that the conductor 24 links the row B in a first sense and the rows A, C . . . *m* respectively in the opposite sense. A transistor 30 has its base connected to a row selection terminal *b* and is adapted to short-circuit a pair of terminals 26 and 28 of the conductor 24 upon the energization of the terminal *b*. Under these conditions, the core 2–B will switch stable states upon the pulsing of the column 2, while the remaining cores will remain in their present stable state.

FIGURE 1C illustrates the connection of the matrix for the selection of a core in row C. The conductor 32 is seen to link the cores of row C in a first sense and the cores of the remaining rows A, B . . . *m* respectively in the opposite sense. A pair of terminals 34 and 36 are connected to the emitter and collector respectively of a transistor 38. Upon the energization of a row selection terminal *c* which is connected to the base of the transistor 38, the latter becomes conductive and short-circuits the terminals 34 and 36 of the conductor 32. If the column 2 is pulsed thereafter, the core 2–C will switch stable states.

If the simultaneous selection of cores linked by the same column winding but located in different rows is desired, the cores may be connected in a manner whereby more than one row is linked in the aforementioned first sense by a single conductor. For example, if the conductor 32 in FIGURE 1C were to link the rows B and C in the first sense and all other rows in the opposite sense, the energization of the column 2, after the terminals 34 and 36 are short-circuited, will cause the cores 2–B and 2–C to switch stable states.

It will be noted from the operation of the apparatus of FIGURE 1, that only a single drive pulse source is required together with column and row selection signals which must be provided in any event. Once a row selection has been made by applying a pulse to the base of the appropriate transistor in order to short-circuit the terminals of a chosen conductor, the drive pulse is applied. It will be apparent that, within relatively wide limits, neither the width nor the amplitude of the drive pulse is therefore critical, provided only the drive pulse is applied during the period when the chosen conductor is short-circuited and is not so large as to be capable of switching a core by itself. It is to be noted particularly that the characteristics of this pulse are independent of the characteristics of any other pulse, i.e. of a pulse derived from any other source.

It will be understood that the embodiment of the invention illustrated in FIGURE 1 is not limited to the precise connections shown, provided only the chosen core row is linked in a first sense and the remaining core rows are linked in the opposite sense. Thus, where successively disposed core rows are linked in the same sense (e.g. the core rows B and C in FIGURE 1A which are both linked in the opposite sense), it is possible to save the conductor portion 96 and to start threading the cores of the row C from the right hand side. This is carried out by the simple expedient of threading the cores of the row C in the reverse manner from that in which the row B is threaded. Thus, the current flow through the conductor which links the cores of the row C will be in the opposite direction from that which links the cores of the row B. However, since the cores of the row C are also threaded in the opposite manner, row C is effectively linked in the same sense as row B, i.e. in a sense opposite to the linkage of row A.

While the apparatus which is illustrated in FIGURE 1 requires only a single short-circuiting switch in order to effect the selection of a core in any given row, a relatively large total number of conductors is necessary, each of which must thread every core in the matrix. Inasmuch as it is desirable to keep the size of the cores small in order to minimize the power requirements, their inductance and the resultant apparatus of FIGURE 1 may not be practical for a matrix which has a very large number of cores. FIGURE 2 illustrates a core matrix 40 together with its appropriate core selection circuitry which overcomes the foregoing disadvantages. Wherever possible, applicable reference numerals have been retained. For the sake of simplicity, a matrix having three columns and three rows only has been shown, it being understood that the invention is not so limited. As in the case of FIGURE 1, each core column is linked by a single conductor which is connected between the output of the column selection circuit 10 and ground. A drive pulse source 14 is connected to the column selection circuit, the appropriate signal on the input 12 of the latter being effective to place the drive pulses on the selected column conductor. The core rows A, B and C are linked respectively by single row conductors having terminals $A_1$–$A_2$, $B_1$–$B_2$ and $C_1$–$C_2$.

A core selection is effected by connecting the core rows so that the cores of the chosen row are linked in a first sense while the cores of the remaining rows are linked in the opposite sense. Thus, if it is desired to select the core 2–A, the appropriate signal on an input 42 of the row selection circuit 44 will place a pulse on the output *a* of the latter. Transistors 46, 47 and 48, which are seen to have their bases connected to the output *a*, are thus rendered conductive, while the absence of appropriate signals on the outputs *b* and *c* of the row selection circuit 44 maintains the remaining transistors nonconductive. Accordingly, a conductive path is completed which leads from the terminal $A_2$ to the terminal $A_1$ to link the cores of row A in a first sense, to the emitter of the transistor 48, from the collector of the latter to the terminal $B_1$ and then to terminal $B_2$ to link row B in the opposite sense, to the emitter of the transistor 47, from the collector of the latter to the terminal $C_1$ and then to the terminal $C_2$ to link row C in the aforesaid opposite sense, to the emitter of the transistor 46, and from the collector of the latter back to the terminal $A_2$.

The action in the core matrix is similar to that described in connection with FIGURE 1. Upon the application of a drive pulse to the cores of column 2, a resultant current flows in the completed conductive path described above. Neither the drive pulse applied to the core column nor the resultant current in the completed conductive path is sufficient by itself to switch the stable state of the magnetic core. In the case of the core 2–A, however, the fluxes in the core due to the drive pulse and to the resultant current respectively are in the same direction and they are sufficient to exceed the threshold of the core to cause the latter to switch to its other stable state.

If it is desired to select a core in row B of the matrix, a suitable signal is applied to the input 42 of the row selection circuit 44 so that the output *b* thereof is energized. The transistors 49, 50 and 51 are then rendered conductive, the resultant completed conductive path in which a current can flow upon the energization of a core column being as follows: From the terminal $A_1$ to $A_2$ to link the row A in the aforesaid opposite sense, from the terminal $A_2$ to the emitter of the transistor 49, from the collector of the latter to the terminal $B_2$ and then to $B_1$ to link the row B in the aforesaid first sense, from $B_1$ to the emitter of the transistor 51, from the collector of the latter to the terminal $C_1$ and then to $C_2$ to link the row C in the first sense, from $C_2$ to the emitter of the transistor 50 and from the collector of the latter back to the terminal $A_1$.

The energization of the output *c* of the row selection circuit 44 results in the following completed conductive path: From the terminal $A_1$ to $A_2$ to link the row A in the aforesaid opposite sense, from $A_2$ to the emitter of the transistor 52, from the collector of the latter to the terminal $B_1$ and then to $B_2$ to link the row B in the opposite sense, from $B_2$ to the emitter of the transistor 53, from the collector of the latter to the terminal $C_2$ and then to $C_1$ to link the row C in the first sense, from $C_1$ to the emitter of the transistor 54, and from the collector of the latter to the terminal $A_1$.

The apparatus of FIGURE 2 requires only one drive pulse source, the pulses of which may have considerable latitude with regard to pulse width and pulse amplitude. Similarly, a much greater latitude can be tolerated in the characteristics of the cores and of the transistors than is possible in presently available apparatus of this kind.

Figure 3:
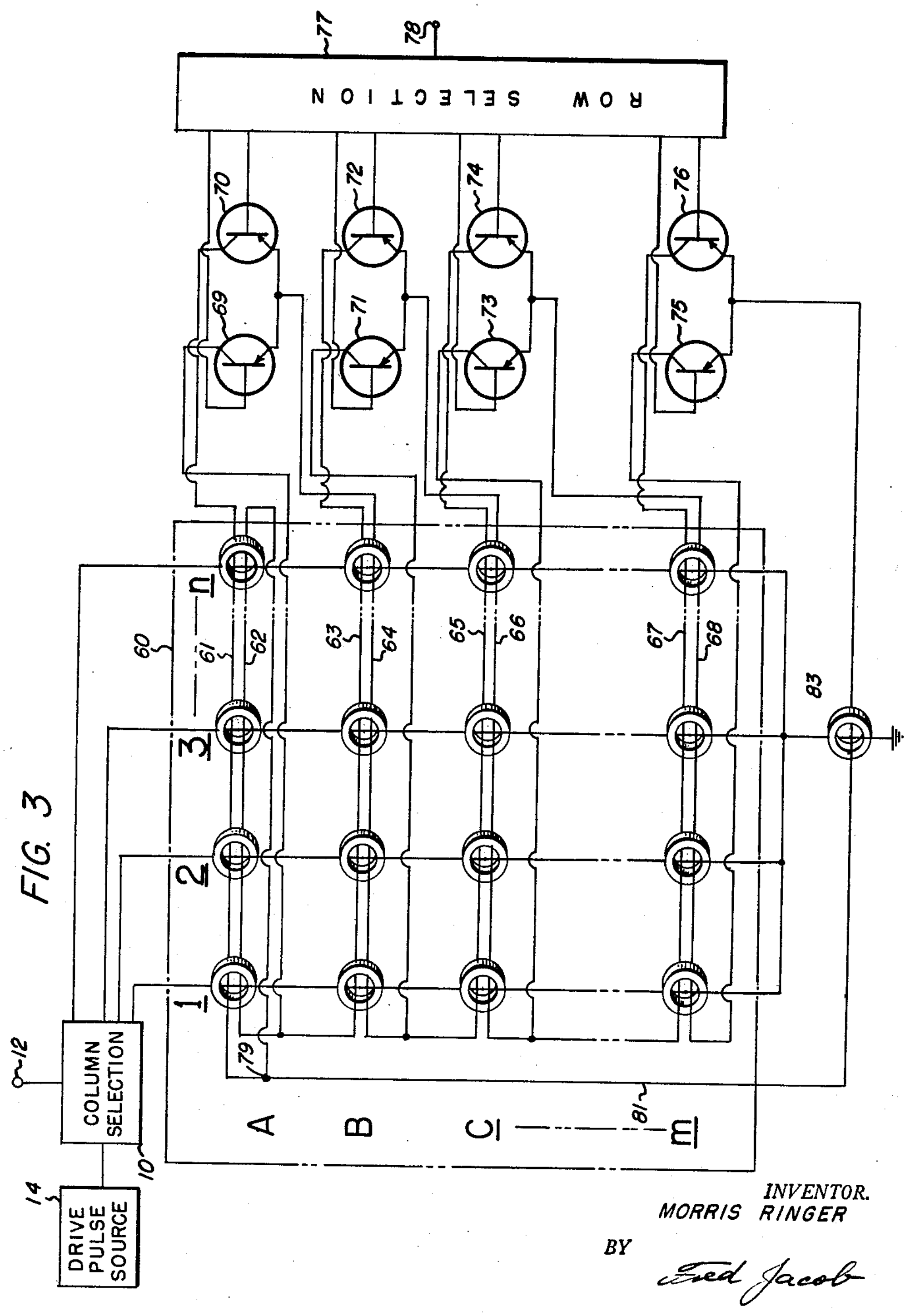
FIGURE 3 illustrates a further embodiment of the invention.

Although the apparatus illustrated in FIGURE 2 minimizes the number of wires required to thread each core in order to practice the invention herein, the number of transistors required is relatively large. FIGURE 3 illustrates another embodiment of the invention in which a total of two transistors per core row are required, the desired short-circuit paths are formed by means of a separate pair of conductors associated with each row and linking the cores thereof. Wherever possible, applicable reference numerals have been retained.

The cores of the matrix 60 are seen to be organized into columns 1, 2, 3 . . . *n*, while the core rows go from A, B, C . . . *m*. The respective column windings are connected between the column selection circuit 10 and ground. Each core row is linked by a pair of conductors, conductors 61, 62; 63, 64; 65, 66; and 67, 68. A pair of transistors corresponds to each core row as follows: Transistors 69, 70; 71, 72; 73, 74; and 75, 76. The respective bases of the transistors are connected to a row selection circuit 77 which, in turn, is energized from a terminal 78.

The emitters of each transistor pair are connected to a common junction point. The even-numbered conductor of each conductor pair threading a core row is tied to the common junction point of the preceding transistor pair. The other terminal of the aforesaid even-numbered conductor is connected to the collector of the odd-numbered transistor of the corresponding transistor pair. The collector of the even-numbered transistor of the corresponding transistor pair is connected to one terminal of the odd-numbered conductor of each conductor pair, the other terminal of the last-named conductor being connected to the aforesaid collector of the odd-numbered transistor of the subsequent transistor pair.

The connections of the conductors 61 and 62 is somewhat different since the core row A forms the first row of the matrix illustrated. Accordingly, one of the terminals of the conductor 61, instead of being connected to the collector of the odd-numbered transistor of the subsequent transistor pair, is connected to the junction point 79 together with one terminal of the conductor 62. The junction point 79 is further connected to the common junction point of the emitters of the transistor pair 75, 76 by way of the conductor 81. A bistable magnetic booster core 83 is linked by the condudctor 81, as well as by the winding of the core column 1.

In order to illustrate the operation of the apparatus of FIGURE 3, it will be assumed that it is desired to select the core 2–B. To this end, the row selection circuit 77 is suitably energized from the terminal 78 so that the transistors 69, 70, 71, 74 and 76 are cut off while the transistors 72, 73 and 75 are rendered conductive. Proper energization from the terminal 12 then permits the column selection circuit 10 to apply column drive pulses derived from the drive pulse source 14, to the winding linking the column 2. Accordingly, the cores 2–A, 2–B, 2–C . . . 2–*m* are energized to a point below their respective threshold levels to induce currents in the respective row conductors linked by these cores.

Due to the selective energization of the transistors from the row selection circuit, the row conductors 61, 64, 65 and 67 are open and the following short-circuit path is estalished: From the emitter of the transistor 75 to its collector, through the row winding 68, through the transistor 73, through the row winding 66, through the transistor 72, through the row winding 63, through the row winding 62, to the junction point 79 and back to the starting point by way of the conductor 81. Since the flux linkage of the cores 2–A, 2–C . . . 2–*m* due to the resultant short-circuit current has a direction opposite to the flux linkage due to the current in the winding of the column 2, these cores remain in the same stable state. The flux linkage of the core 2–B, however, resulting from the current due to the column selection pulse and from the resultant short-circuit current, is in the same direction and, accordingly, the core switches stable states. By selectively switching the transistors on or off, any desired short-circuit path may be created to select a desired core.

The number of transistors which are conductive and connected in series for any given row selection is three. It will be apparent that this number is increased proportionately for a matrix of larger size. Although the total forward impedance of the transistors which are conductive and connected in series is negligible for a small number of transistors, the impedance may be sufficiently large for a large martix to limit the current in the chosen short-circuit path to a value below the selection level. In order to preclude malfunctioning of the core selection due to trouble from this source, one or more bistable magnetic booster cores similar to those in the matrix may be added and so disposed that they are pulsed by the column windings. These cores, which are otherwise inactive, are additionally linked by the chosen short-circuit path, their sole function being to provide the additional voltage to compensate for the impedance of the short-circuited path and thereby increase the current circulating in the latter. In order to overcome this condition in the circuit of FIGURE 3, the bistable magnetic booster core 83, which is otherwise inactive, is linked by the column windings as well as by the conductor 81. Accordingly, to use the example of selecting the core 2–B above, an electromotive force in the above-recited short-circuit path is created in a first direction by the cores 2–A, 2–C . . . 2–*m* and by the booster core 83. An electromotive force in the opposite direction is, of course, produced by the core 2–B. If required, additional bistable magnetic cores such as the core 83, may be linked by the column winding and by the conductor 81.

Figure 4A:
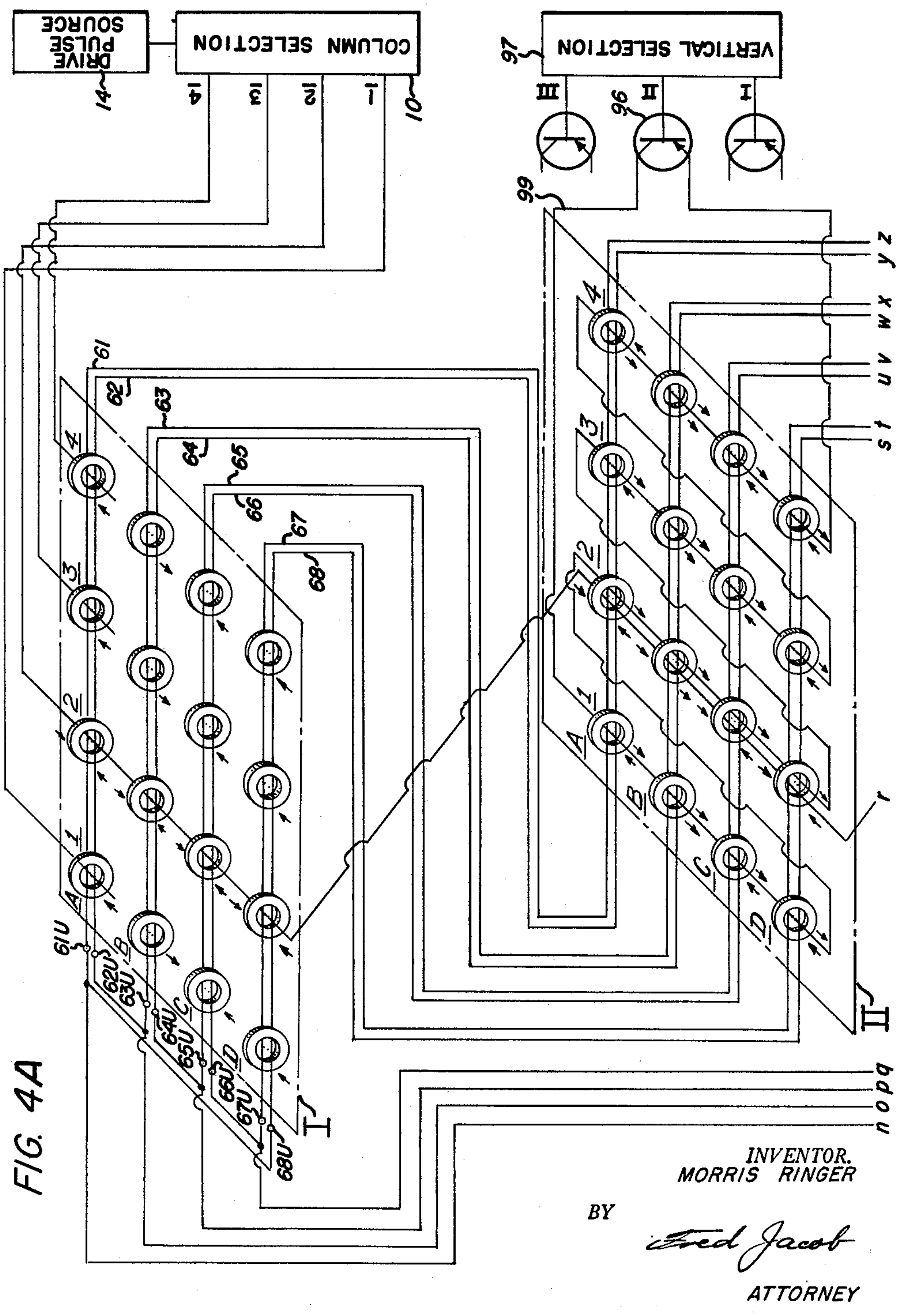
FIGURE 4 illustrates an embodiment of the invention as applied to a three-dimensional core matrix.
Figure 4B:
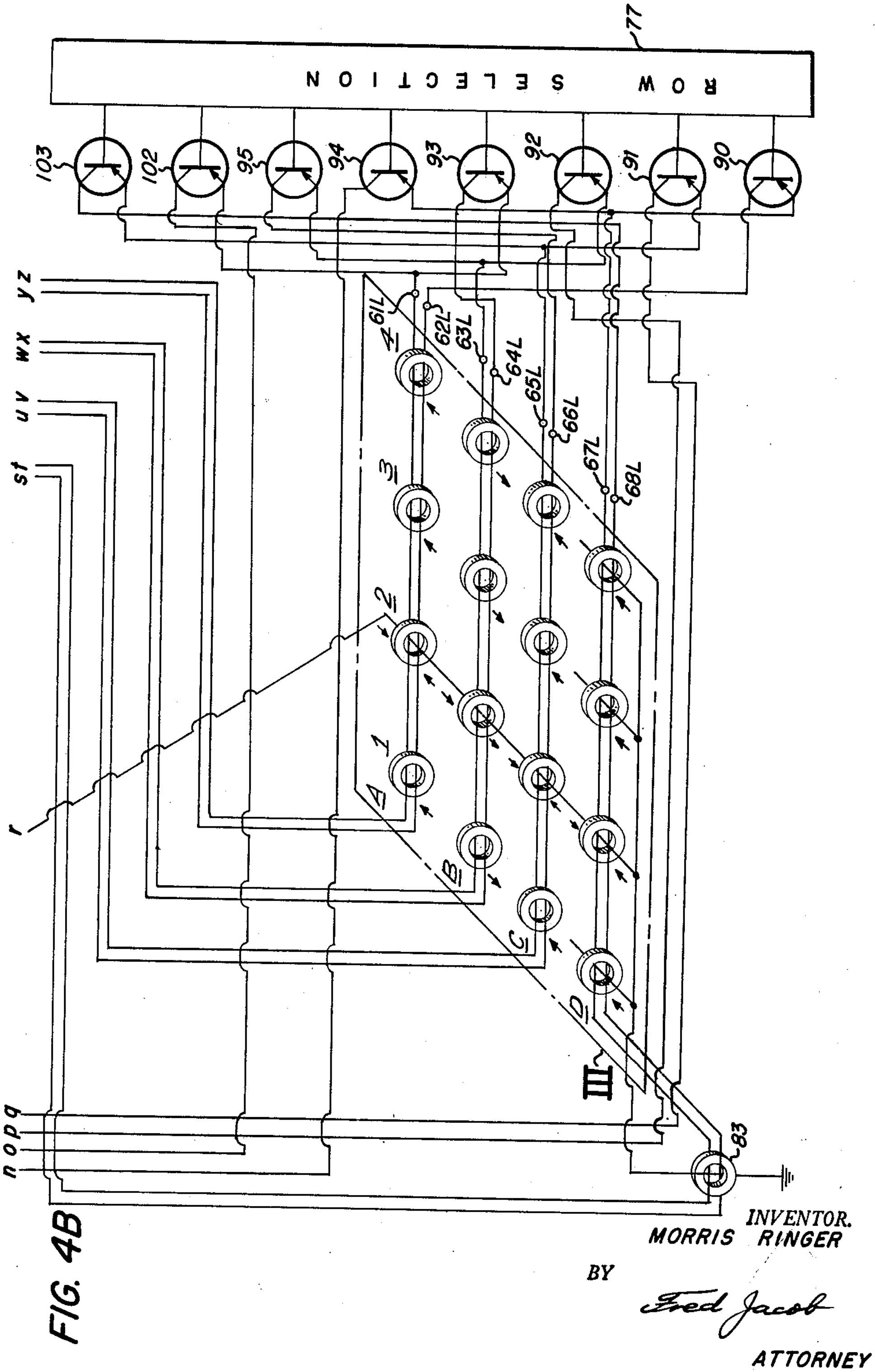

As previously explained, the invention is not limited to a core matrix which is organized into rows and columns of cores in a single plane, but is applicable to a plurality of cores with any number of different sub-groups. FIGURE 4 illustrates an example of how a three-dimensional (three-coordinate) matrix may be organized in accordance with the principles disclosed in connection with the circuit of FIGURE 3. Two planes I and II of the matrix are illustrated in FIGURE 4A and a third plane III is shown in FIGURE 4B. The reference letters *n* to Z indicate corresponding connections in FIGURES 4A and 4B. It will be understood that the invention is applicable to matrices of any desired size. In the subsequent discussion, it will be helpful to think in terms of column stacks and row stacks. A column stack consists of all corresponding core columns in the respective core planes I, II and III, i.e. it contains four planar core columns in the illustration of FIGURE 4. Similarly, a row stack includes all the corresponding rows in the respective core planes and thus consists of four planar core rows.

The organization of the core windings is similar to that shown in FIGURE 3, applicable reference numerals having been retained. Thus, each column stack is linked by a single winding connected between the column selection circuit 10 and ground. The joint ground connection of the windings additionally links a booster core 83. For the sake of clarity, only the winding of the column stack 2 has been shown in its entirety. Each row stack is linked by a pair of windings, to wit, the windings 61, 62; 63, 64; 65, 66; and 67, 68. The terminals of each winding are designated by the reference numeral of the winding itself and the letter U or L, depending on the terminal position. The terminal 61U is directly joined to the terminal 68U, while the terminal 62U is directly connected to the terminal 63U. Similarly, the terminals 64U and 65U are directly connected together, as are the terminals 66U and 67U. The row windings 67 and 68 additionally link the booster core 83 in the opposite sense.

A row selection circuit 77 controls the conductive state of the transistors 90, 91, 92, 93, 94, 95, 102 and 103 by applying signals to the bases of the transistors. The emitter and collector of the transistor 90 are connected to the terminals 67L and 62L respectively. The emitter and collector of the transistor 91 are connected to the terminals 65L and 67U respectively. The emitter and collector of the transistor 92 are connected to the terminals 63L and 65U respectively. The emitter and collector of the transistor 93 are connected to the terminals 61L and 64L respectively. The emitter and collector of the transistor 94 are connected to the terminals 67L and 61U respectively. The emitter and collector of the transistor 95 are connected to the terminals 63L and 66L respectively. The emitter and collector of the transistor 102 are connected to the terminals 61L and 63U respectively. The emitter and collector of the transistor 103 are connected to the terminals 65L and 68L respectively.

The cores of each plane are additionally linked by a vertical selection winding. For the sake of clarity, only the vertical selection winding 99 of the plane II is shown in the drawing. The terminals of each vertical selection winding are connected to the emitter and collector respectively of a transistor whose base is connected to one output terminal of a vertical selection circuit 97. The transistor associated with the winding 99 is labeled 96 in the drawing.

In the embodiment of the invention which is illustrated in FIGURE 4 the magnitudes of the applied currents are so chosen, by a suitable choice of the winding turns ratios of the cores, so that a triple current coincidence is required. More specifically, a particular core will fail to switch unless the currents in all three core windings induce a flux in the same direction in the core. The operation of the circuit will be illustrated for the case where it is desired to write into, i.e. to switch, the core 2–B in the plane II.

The row selection circuit 77 is energized appropriately so that only the transistors 91, 93 and 94 are conductive. The closed conductive path which is thereby established is as follows: 61U–61L; 61L–64L by way of the transistor 93; 64L–64U; 64U–65U; 65U–65L; 65L–67U by way of the transistor 91; 67U–67L; and 67L–61U by way of the transistor 94. It will be noted that the cores of the row stack B are linked in a sense opposite to that of the row stacks A, C and D. The vertical selection circuit 97 is energized so that the transistor 96 alone is rendered conductive to short-circuit the vertical selection winding 99. The corresponding vertical selection windings in the planes I and III remain open.

When the column selection circuit 10 is thereafter energized, a drive pulse from the source 14 is applied to the column stack 2, i.e. to the cores of column 2 of each of the planes of the matrix. The direction of the flux linkage due to the column selection current is indicated in FIGURE 4 by means of an arrow above each of the affected cores. As explained in connection with the embodiments illustrated in FIGURES 1 to 3, the current in the column winding induces a corresponding current in the above-recited closed conductive path owing to the transformer action in the cores which are commonly linked by the closed path and the pulsed column winding. The direction of the flux linkage due to the induced row selection current is indicated by means of an arrow below and to the left of each core.

It will be noted that the current induced in the closed row winding path produces a direction of flux linkage of the cores of the row stack B which is opposite to that of the cores of the row stacks A, C and D respectively. The cores of the column stack 2 are each linked by the flux due to two currents. In the plane II, the flux linkages of the core in the rows 2–A, 2–C and 2–D respectively, are seen to be opposed while the flux linkages of each of the cores of the row 2–B are aiding. As previously stated, the currents are so chosen that three aiding flux linkages are required in order to switch a core. Accordingly, the cores of the row stack 2–B remain energized below their threshold level without any additional flux linkage.

A third flux linkage is due to the current flowing in the short-circuited vertical selection winding 99 owing to the transformer action in the cores of plane II which are commonly linked by this winding and by the pulsed column winding. The direction of the flux linkage due to current flow in the winding 99 is indicated in FIGURE 4 by means of arrows below each affected core and to the right of it, and is seen to aid the flux linkages due to the current in the winding of row B. In the core 2–B these two aiding flux linkages are further aided by the flux linkage due to the current in the column winding. Since the triple flux in the same direction energize the core beyond its threshold level, the core is switched. This action does not occur in the planes I and III where the vertical selection windings are not short-circuited.

Although a three-dimensional matrix selection technique has been illustrated and described which requires the coincidence of three currents to switch a core, it will be clear that the invention, is not so limited. For example, it is possible to effect a vertical selection without a vertical seelction winding, by connecting a transistor switch to bypass each row winding of the non-selected planes. In the example above, vertical selection then consists of bypassing the row windings of the planes I and III so that the only flux applied to the cores of these planes is due to the column drive pulse. The current magnitudes are so chosen that core selection takes place in plane II as a result of the combined fluxing due to the column energization and due to the current in the row windings. Similarly, a vertical selection may be effected without a vertical selection winding by inhibiting core switching in the non-selected planes by energizing the cores thereof in the opposite direction.

The invention is not limited to short-circuiting means consisting of transistors as shown herein, but may comprise any device which is capable of completing the desired conductive path. Moreover, the invention is not limited to the single plane matrix shown in FIGURES 1 through 3, nor to the three-dimensional core matrix which is illustrated in FIGURE 4. The cores may be arranged in any desired manner, the respective sub-groupings corresponding to the rows, columns and stacks shown herein being obtained by appropriately linked conductors. It is further possible to apply the principles of the invention herein to include more than three of the above-discussed sub-groups.

As previously discussed, the number of booster cores included in any desired short-circuit path is determined by the current which is required in the path. Although only a single booster core has been shown in FIGURE 4, it will be understood that further cores may be added in accordance with the requirements of the particular circuit arrangement employed.

In accordance with the principles of this invention, the necessity for synchronizing two or more pulses in a core matrix in order to achieve coincidence is obviated. Core selection still requires the energization of conventional row, column or vertical selection circuits. However, the timing of the energization pulses is not critical, provided only the pulses occur when the selection circuits are active. The applied pulses may vary in width and in amplitude between relatively wide limits far less critical than was heretofore the case. Additionally, the core characteristics need not be critically controlled as in the case in conventional matrices.

It will be apparent from the foregoing disclosure of the invention that numerous modifications, changes and equivalents will now occur to those skilled in the art, all of which fall within the true spirit and scope contemplated by the invention.

What is claimed is:

1. In combination with a core matrix including a plurality of magnetic cores each having two stable states and a substantially square loop hysteresis characteristic requiring at least a threshold level of energization to change states, said cores being organized into columns and rows in at least one plane, means for energizing a selected one of said columns to establish a first flux having a first direction in each of the cores thereof, and means for establishing a short-circuit path which links a selected core row in a first sense and the remaining core rows in the opposite sense, the current flowing in said short-circuit path upon the energization of said selected core column being adapted to establish a second flux, said second flux having said first direction in the cores of said selected row and the opposite direction in the cores of said remaining rows, said first and second fluxes being individually incapable of exceeding said threshold level of said cores.

2. In combination with a core matrix including a plurality of magnetic cores each having two stable states and a substantially square loop hysteresis characteristic requiring at least a threshold level of energization to change states, said cores being organized into at least one plane of columns and rows, means for energizing a selected one of said columns to establish a first flux having a first direction in each of the cores thereof, a plurality of open conductive paths each linking a different one of said core rows in a first sense and the remaining core rows in the opposite sense, and means for selecting at least one core row by completing the conductive path linking it in said first sense substantially through a short circuit, the current flowing in said completed path upon the energization of said selected core column being adapted to establish a second flux having said first direction in the cores of said selected row and the opposite direction in the cores of the remaining rows linked by said path, said first and second fluxes being individually incapable of exceeding said threshold level of said core.

3. The apparatus of claim 2 wherein the combined flux in said first direction in at least one core chosen by the selection of said core column and of said core row respectively exceeds said threshold level.

4. The apparatus of claim 2 wherein said core matrix comprises a stack of substantially identical planes, the cores of each column stack and each row stack respectively being connected for joint energization in the same direction, a vertical selection winding linking the cores of each of said planes in the same sense, and means for selecting at least one of said planes by short-circuiting its vertical selection winding, the current flowing in said last-recited winding upon the energization of said selected core column being adapted to establish a third flux having said first direction in each of the cores of the selected planes, the combined flux in said first direction in the cores chosen by the selection of said column, said row and said plane exceeding said threshold level.

5. In combination with a core matrix having a plurality of magnetic cores arranged at least in columns and rows, core selection means comprising, means for energizing a chosen column which contains the selected core to establish a flux in a first direction in each of the cores thereof, and means for establishing a closed conductive path of low impedance linking a chosen core row which contains said selected core in a first sense and linking the remaining core rows in the opposite sense, the current flowing in said closed conductive path upon the energization of said chosen core column being adapted to establish a flux in said first direction in the cores of said chosen core row and a flux in the opposite direction in the cores of said remaining core rows.

6. The apparatus of claim 5 and further comprising at least one booster core, said booster core being connected for joint energization with each of said columns, said booster being further adapted to be linked by each of said closed conductive paths.

7. In combination with a three-dimensional core matrix having a plurality of magnetic cores arranged in stacks of core columns and core rows, core selection means comprising, means for energizing a chosen column stack which contains the selected cores to establish a flux in a first direction in each of the cores thereof, and means for establishing a closed conductive path of low impedance linking a chosen row stack which contains said selected cores in a first sense and linking the remaining row stacks in the opposite sense, the current flowing in said closed conductive path upon the energization of said chosen core column being adapted to establish a flux in said first direction in the cores of said chosen row stack and a flux in the opposite direction in the cores of said remaining row stacks.

8. In combination with a multi-plane core matrix having a plurality of magnetic cores arranged in stacks of core columns and core rows, core selection means comprising, means for energizing a chosen column stack which contains the selected cores to establish a flux in a first direction in each of the cores thereof, means for establishing a low-impedance closed conductive path linking a chosen row stack which contains said selected cores in a first sense and linking the remaining row stacks in the opposite sense, the current flowing in said closed conductive path upon the energization of said chosen core column being adapted to establish a flux in said first direction in the cores of said chosen row stack and a flux in the opposite direction in the cores of said remaining row stacks, and means for establishing low-impedance closed conductive paths linking the cores of respective ones of the core planes which contain said selected cores, the current flowing in each of said last-recited paths upon the energization of said column stack being adapted to establish a flux in said first direction in each of the cores linked thereby.

9. A data storage device including a plurality of magnetic cores arranged at least in columns and in rows, core selection means comprising means for energizing a selected one of said columns to establish a flux in a first direction in each of the cores thereof, a plurality of conductors, each of said cores being individually linked by at least one of said conductors, means for connecting said conductors to establish a conductive path linking a selected one of said core rows in a first sense and all of the remaining core rows in the opposite sense, and means for completing said conductive path through a low-impedance link, the current flowing in said completed path upon the energization of said selected core column being adapted to establish a flux in said first direction in the cores of said selected row and in the opposite direction in the cores of said remaining rows.

10. A data storage device comprising a plurality of magnetic cores organized into at least first and second sub-groups in a manner whereby each of said cores belongs to one of said first and second sub-groups respectively, core selection means comprising, means for energizing a chosen first sub-group containing said selected core to establish a flux in a first direction in each of the cores of said first sub-group and means for establishing a substantially short-circuited conductive path linking a chosen second sub-group containing said selected core in a first sense and linking the remaining second sub-groups in the opposite sense, the current flowing in said conductive path upon the energization of said chosen first sub-group being adapted to establish a flux in said first direction in the cores of said chosen second sub-group and to establish a flux in the opposite direction in the cores of said remaining second sub-groups.

11. A data storage device comprising a plurality of magnetic cores organized into at least first, second and third sub-groups in a manner whereby each of said cores belongs to one of said first, second and third sub-groups respectively, core selection means comprising, means for energizing a chosen first sub-group containing said selected cores to establish a flux in a first direction in each of the cores of said first sub-group, means for establishing a closed conductive path linking a chosen second sub-group containing said selected cores in a first sense and linking the remaining second sub-groups in the opposite sense, the current flowing in said closed conductive path upon the energization of said chosen first sub-group being adapted to establish a flux in said first direction in the cores of said chosen second sub-group and to establish a flux in the opposite direction in the cores of said remaining second sub-groups, and means for establishing closed conductive paths linking the cores of respective ones of said third sub-groups which contain said selected cores, the current flowing in each of said last-recited paths upon the energization of said first sub-group being adapted to establish a flux in said first direction in each of the cores linked thereby.

12. A data storage device comprising a plurality of at least first, second and third sub-groups respectively of bistable elements organized in a manner whereby each of said elements belongs to one of said first, second and third sub-groups, each of said elements requiring at least a threshold level of energization to switch from one of its bistable states to the other, means for selecting a plurality of elements belonging to chosen ones of said first, second and third sub-groups respectively, comprising, means for selectively energizing all the elements of said chosen first sub-groups in a first direction to a level below said threshold, means for selectively completing at least one conductive path linking the elements of said chosen second sub-groups in a first sense and linking the elements of the remaining second sub-groups in the opposite sense, the current flowing in said conductive path upon the energization of said chosen first sub-groups being adapted to energize the elements of said chosen second sub-groups in said first direction and to energize the elements of said remaining second sub-groups in the opposite direction, the energization due to said current being below the threshold of the energized elements, and means for causing only said selected plurality of elements as members of said chosen third sub-groups to exceed their threshold level.

13. A data storage device comprising a plurality of bistable elements organized into at least a plurality of first and second sub-groups respectively in a manner whereby each of said elements belongs to one of said first and second sub-groups respectively, each of said elements requiring at least a threshold level of energization to switch from one of its stable states to the other, means for selecting one of said elements comprising a pulse source, means for coupling a selected one of said first sub-groups to said pulse source to energize the elements thereof in a first direction, to a level below said threshold, and means for completing a substantially short-circuited conductive path linking the elements of a chosen second sub-group which contains said selected element in a first sense and linking the elements of the remaining second sub-groups in the opposite sense, the current flowing in said conductive path upon the energization of said first sub-group being adapted to energize the elements of said chosen second sub-group in said first direction and to energize the elements of said remaining second sub-groups in the opposite direction, the level of energization due to said current being below the threshold of the energized elements but exceeding the threshold of said selected element in said first direction in cooperation with the energization of the latter as a member of said first sub-group.

14. A data storage device comprising a plurality of bistable elements organized into at least one first sub-group and a plurality of second sub-groups in a manner whereby each of said elements belong to a first and second sub-group respectively, each of said elements requiring at least a threshold level of energization to switch from one of its stable states to the other, means for selecting one of said elements including means for energizing the elements of said first sub-group in a first direction to a level below said threshold, and means for completing a conductive path linking the elements of a chosen second sub-group which contains said selected element in a first sense and linking the elements of the remaining second sub-groups in the opposite sense, the current flowing in said conductive path upon the energization of said first sub-group being adapted to energize the elements of said chosen second sub-group in said first direction and to energize the elements of said remaining second sub-groups in the opposite direction, the level of energization due to said current being below the threshold of the energized elements but exceeding the threshold of said selected element in said first direction in cooperation with the energization of the latter as a member of said first sub-group.

15. A data storage device comprising a plurality of magnetic cores each having two stable states and a substantially square hysteresis characteristic requiring at least a threshold level of energization to change states, said cores being organized by columns and rows in at least one plane, means for energizing a selected one of said columns to establish a first flux having a first direction in each of the cores thereof, a plurality of conductors, each of said core rows being individually linked by at least one of said conductors, means for connecting said conductors to establish a conductive path linking a selected one of said core rows in a first sense and linking the remaining core rows in the opposite sense, and means for completing said conductive path substantially through a short-circuit link, the current flowing in said completed path upon the energization of said selected core column being adapted to establish a second flux having said first direction in the cores of said selected row and having the opposite direction in the cores of said remaining rows, said first and second fluxes being individually incapable of exceeding said threshold level of the cores linked thereby.

16. A data storage device comprising a plurality of magnetic cores each having two stable states and a substantially square loop hysteresis characteristic requiring at least a threshold level of energization to change states, said cores being organized by columns and rows in at least one plane, means for energizing a selected one of said columns to establish a first flux having a first direction in each of the cores thereof, a plurality of conductors, each of said core rows being individually linked by a pair of said conductors, means for connecting said conductors to establish a substantially short-circuited conductive path linking a selected one of said core rows in a first sense and linking the remaining core rows in the opposite sense, and means for completing said conductive path, the current flowing in said completed path upon the energization of said selected core column being adapted to establish a second flux having said first direction in the cores of said selected row and having the opposite direction in the cores of said remaining rows, said first and second fluxes being individually incapable of exceeding the threshold level of the cores linked thereby.

17. The apparatus of claim 16 wherein the combined flux in said first direction in at least one core chosen by the selection of said core column and of said core row respectively exceeds said threshold level.

18. The apparatus of claim 16 wherein said plurality of magnetic cores comprises a stack of substantially identical planes, the cores in each column stack and each row stack respectively being connected for joint energization in the same direction, a vertical selection winding linking the cores of each of said planes in the same sense, and means for selecting at least one of said planes by short-circuiting its vertical selection winding, the current flowing in said last-recited winding upon the energization of said selected core column being adapted to establish a third flux having said first direction in each of the cores of the selected plane, the combined flux in said first direction in the cores chosen by the selection of said column, said row and said plane exceeding said threshold level.

19. A a data storage device comprising a plurality of bistable magnetic cores each having a substantially rectangular hysteresis characteristic requiring at least a threshold level of energization to change its magnetic state, said cores being disposed in columns and rows stacked in a plurality of planes, core selection means comprising a pulse source, means for connecting said pulse source to at least one chosen column stack to energize the cores thereof in a first direction below their threshold level, means for establishing at least one substantially short-circuited conductive path linking the cores of a chosen row stack in a first sense and the cores of the remaining row stacks in the opposite sense, the current flowing in said conductive path upon the energization of said chosen column stack being adapted to energize the cores of said chosen row stack below said threshold level in said first direction and the cores of the remaining row stacks below said threshold level in the opposite direction, and means for establishing a substantially short-circuited conductive path in at least one chosen plane linking all the cores thereof, the current flowing in said last-recited path upon the energization of said chosen column stack being adapted to energize the cores of said chosen plane below said threshold level in said first direction, the joint energization in said first direction of the selected cores which are disposed in said chosen column and row stacks and said chosen planes exceeding said threshold level.

20. The apparatus of claim 19 and further comprising at least one booster core having hysteresis characteristics substantially identical to those of said matrix, said booster core being linked by each of said column stack conductors, and by said short-circuit path which links said row stacks.

21. A data storage device comprising a matrix of bistable magnetic cores each having a substantially rectangular hysteresis characteristic to require at least a threshold level of energization to change its magnetic state, said cores being disposed in columns and rows stacked in a plurality of planes, a pulse source, a separate conductor linking each column stack, first switching means for connecting said pulse source to the conductor of a chosen column stack, said pulse source being adapted to induce a first flux having a first direction in the cores of said chosen column stack, a pair of conductors linking each row stack, second switching means for connecting said last-recited conductors into a short-circuit path linking a chosen row stack in a first sense and linking the remaining row stacks in the opposite sense, the current flowing in said short-circuit path upon the energization of said chosen column stack being adapted to induce a second flux having said first direction in said chosen row stack and having the opposite direction in the remaining row stacks, a separate conductor linking cores of each of said planes and third switching means for short-circuiting one of said last-recited conductors corresponding to a chosen plane, the current flowing in said last-recited short-circuit being adapted to induce a third flux in said first direction in the cores of said chosen plane, said first second and third flux being individually incapable of exceeding the threshold level of said cores but being jointly adapted to drive the cores selected by the choice of said column stack, said row stack and said plane beyond said threshold level.

References Cited in the file of this patent

UNITED STATES PATENTS

| | | |
|---|---|---|
| 2,733,860 | Rajchman | Feb. 7, 1956 |
| 2,733,861 | Rajchman | Feb. 7, 1956 |
| 2,734,183 | Rajchman | Feb. 7, 1956 |
| 2,736,880 | Forrester | Feb. 28, 1956 |
| 2,802,203 | Stuart-Williams | Aug. 6, 1957 |
| 2,920,315 | Markowitz et al. | Jan. 5, 1960 |

OTHER REFERENCES

Publication I, Communications and Electronics, January 1954, pages 822–830, #31.